(12) United States Patent
Holmes

(10) Patent No.: US 12,187,953 B2
(45) Date of Patent: Jan. 7, 2025

(54) SYSTEM AND METHOD FOR CHARGE INDUCED MONOFUNCTIONALIZED NANOFLUID HEAT TRANSFER

(71) Applicant: VOLVO TRUCK CORPORATION, Gothenburg (SE)

(72) Inventor: Patrick Michael Holmes, Frederick, MD (US)

(73) Assignee: VOLVO TRUCK CORPORATION, Gothenburg (SE)

( * ) Notice: Subject to any disclaimer, the term of this patent is extended or adjusted under 35 U.S.C. 154(b) by 511 days.

(21) Appl. No.: 17/439,495

(22) PCT Filed: Apr. 23, 2020

(86) PCT No.: PCT/US2020/029452
§ 371 (c)(1),
(2) Date: Sep. 15, 2021

(87) PCT Pub. No.: WO2020/242674
PCT Pub. Date: Dec. 3, 2020

(65) Prior Publication Data
US 2022/0169904 A1 Jun. 2, 2022

Related U.S. Application Data

(60) Provisional application No. 62/853,243, filed on May 28, 2019.

(51) Int. Cl.
*F28D 15/00* (2006.01)
*B82Y 30/00* (2011.01)
(Continued)

(52) U.S. Cl.
CPC ............... *C09K 5/10* (2013.01); *B82Y 30/00* (2013.01); *B82Y 40/00* (2013.01)

(58) Field of Classification Search
CPC ............ C09K 5/10; B82Y 30/00; B82Y 40/00
(Continued)

(56) References Cited

U.S. PATENT DOCUMENTS 9,051,502 B2   6/2015   Sedarous et al.
2002/0145792 A1  10/2002  Jacobson et al.
(Continued)

FOREIGN PATENT DOCUMENTS

CN   1329123 A   1/2002
CN   1464024 A   12/2003
(Continued)

OTHER PUBLICATIONS

European Official Action (2023-06-05) for corresponding European App. 20815528.3.
(Continued)

*Primary Examiner* — Davis D Hwu
(74) *Attorney, Agent, or Firm* — WRB-IP PLLC

(57) ABSTRACT

A method for charge-induced functionalized nanofluid heat transfer includes preparing a nanofluid so that a first type of nanoparticles in the nanofluid have a surface charge with a first polarity, and attracting the first type of nanoparticles in the nanofluid to one of a heat sink or a heat source by applying a first voltage to the one of the heat sink or the heat source, the first voltage having a second polarity opposite to the first polarity. A system, for charge-induced functionalized nanofluid heat transfer is also provided.

19 Claims, 3 Drawing Sheets

(51) Int. Cl.
    *B82Y 40/00*      (2011.01)
    *C09K 5/10*       (2006.01)

(58) Field of Classification Search
    USPC .................................................... 165/104.18
    See application file for complete search history.

(56) References Cited

U.S. PATENT DOCUMENTS

| | | | |
|---|---|---|---|
| 2003/0096113 A1 | 5/2003 | Jacobson et al. | |
| 2007/0039721 A1* | 2/2007 | Murray .................. | F28F 13/00 257/E23.098 |
| 2008/0272331 A1 | 11/2008 | Mohapatra et al. | |
| 2012/0186789 A1 | 7/2012 | Sedarous et al. | |
| 2012/0199171 A1* | 8/2012 | Watts ..................... | H10N 10/13 136/212 |

FOREIGN PATENT DOCUMENTS

| | | | |
|---|---|---|---|
| CN | 102917981 A | | 2/2013 |
| CN | 107921398 A | | 4/2018 |
| IN | 20181101959 A | | 10/2019 |
| TW | 1405944 B | * | 8/2013 |
| WO | 2011141486 A1 | | 5/2011 |

OTHER PUBLICATIONS

Shukla Gaurav et al: "Thermal conductivity enhancement of transformer oil using functionalized nanodiamonds", IEEE Transactions On Dielectrics and Electrical Insulation, IEEE Service Center, Piscataway, NJ, US, val. 22, No. 4, Aug. 1, 2015 (Aug. 1, 2015), pp. 2185-2190, XP011666211, ISSN: 1070-9878, DOI: 10.1109/TDEI. 2015.004678.

Chinese Official Action (Jun. 19, 2023) for corresponding Chinese App. 202080033570.4.

International Search Report (Jul. 28, 2020) for corresponding International App. PCT/US2020/029452.

Huang et al., Separation of Long Double-Stranded DNA by Nanoparticle-Filled Capillary Electrophoresis, Anal. Chem. 2004 vol. 76, pp. 192-196 (Jan. 1, 2004).

Nkurlkiyimfura at al. "Heat transfer enhancement by magnetic nanoflulds—a Review" Renewable and Sustainable Energy Reviews, vol. 21 (Feb. 9, 2013): pp. 548-561.

Lin et al. "A novel blood plasma analysis technique combining membrane electrophoresis with silver nanoparticle-based SERS spectroscopy for potential applications in noninvasive cancer detection" Nanomedicine: Nanotechnology, Biology, and Medicine 7 (2011) 655-663.

Daimler AG, Smart Solid Coolant with Dispersed Ferrous Nanoparticles for Optimum Engine Cooling (Nov. 22, 2016).

* cited by examiner

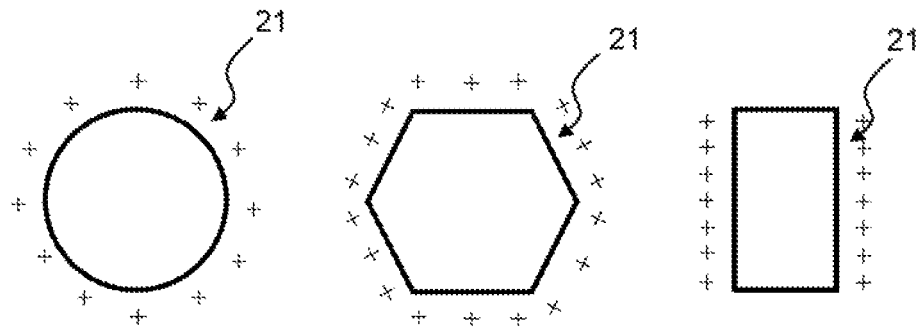
FIG. 1A   FIG. 1B   FIG. 1C
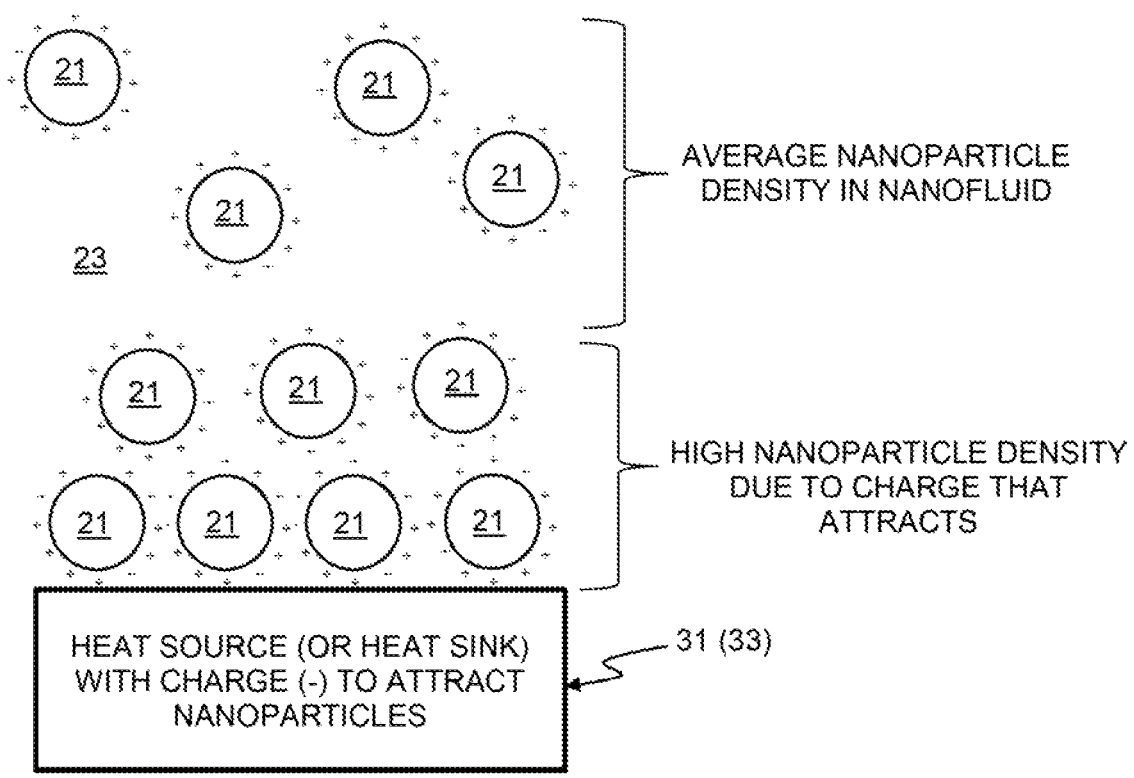
FIG. 2

SYSTEM AND METHOD FOR CHARGE INDUCED MONOFUNCTIONALIZED NANOFLUID HEAT TRANSFER

BACKGROUND AND SUMMARY

The present application claims priority to U.S. Provisional App. 62/853,243, filed May 28, 2019.

The invention relates to a method and a system to facilitate heat transfer in components of an apparatus that generates heat or is heated in operation, for example, an internal combustion engine and associated components, such as a vehicle coolant, engine oil, transmission fluid, or heat exchanger, using a nanofluid as a heat transfer medium, or an apparatus that requires heat transfer, such as heat pumps.

Nanofluids (liquids with nanoparticles) that have a higher thermal conductivity than the neat base fluid (neat base fluid is the baseline liquid without any nanoparticles in it, for example, simple engine coolant) are known. Typical nanoparticles added to fluids require surfactants or constant stirring/agitation in order to keep particles suspended. Even with surfactants or stirring, agglomeration is only slowed, not stopped. Agglomeration of the nanoparticles interferes with heat transfer to the nanoparticles.

Nanoparticles that do not have surface charges will tend to agglomerate and form clusters. These clusters do not have the same beneficial properties of single nanoparticles that are dispersed or suspended, thus defeating the point of adding nanoparticles in the first place. The added functional groups on the surface-charged nanoparticles will help to keep the particles in the solution. Nanoparticles with added functional groups are available from Carbodeon Limited Oy of Vantaa, Finland. While a variety of nanoparticles are suitable for use in connection with the present invention, nanodiamonds with added functional groups are believed to be particularly advantageous in a system according to an aspect of the invention at least because of the high thermal, conductivity of diamond. References to "nanoparticles" herein are to he understood to refer to surface-charged nanoparticles with added functional groups, except where otherwise indicated.

A problem that may be addressed by an aspect the invention is that (despite the proven enhancement to thermal transport by using nanofluids) the amount of heat that can be transferred from the solid heat source to the liquid and then from the liquid to the solid heat sink is limited by the interface between the solid and the liquid. It does not really matter if only the thermal conductivity of the liquid is greatly increased. The limiting factor for heat transfer in a system is the rate heat can cross from the metal to the liquid and vice versa. Increasing thermal conductivity of modern coolants ordinarily does not have a significant impact on heat transfer in a typical system. By the present invention, the rate of heat transfer across the solid-liquid interface of the heat source and heat sink can be increased by increasing the probability of events in which energy can be transferred from the solid heat exchanger to the nanoparticles in the nanofluid, and vice versa.

According to an aspect of the invention, a nanofluid is prepared so that all or a certain amount of the nanoparticles in the fluid have the same surface charge (either + or −) via added functional groups (hydrogen, amines, carboxylated, etc.) attached to the surface of the nanoparticles. These like-charges on the surface create a strong repulsion force between these individual surface-charged nanoparticles, keeping the individual surface-charged nanoparticles away from other ones of the surface-charged nanoparticles— similar to how same magnet poles repel each other. This mutual repulsion allows the surface-charged nanoparticles to stay in suspension and not agglomerate together into large clusters.

According to an aspect of the invention, heat transfer into and dissipation out of a nanofluid may be increased by using a voltage to manipulate the density of these surface-charged nanoparticles in the fluid near heat sinks/heat sources via electric field attraction, i.e., if the surface-charged nanoparticles are positively charged, negatively charging the heat source (or sink) will increase the local density of these surface-charged nanoparticles near the hot area (or cold area). According to an aspect of the invention, a heat exchanger system is provided to circulate a nanofluid between a heat source and a heat sink. An AC voltage is then applied to the heat source/sink with a specific alternating voltage or current at a specific frequency or waveform shape to force surface-charged nanoparticles towards, and then away from the area of interest, that is, the heat source or heat sink. These surface-charged nanoparticles that are manipulated by the electric field will be able to cross the region of low fluid flow near the surface (boundary layer at walls during fluid flow that also limits thermal conductivity) to increase heat transfer into the bulk fluid. The high density of these surface-charged nanoparticles near the surface of an electrically polarized heat source will absorb more heat than the base fluid or nanofluid alone. The polarity of the heat source is then switched to repel the hot surface-charged nanoparticles away and into the main body of the fluid to be carried away by the fluid flow. Changing the polarity again will attract fresh, cool surface-charged nanoparticles from the fluid flow to the heat source to dissipate heat again. For example, a system may pump the fluid using a mechanical pump. The surface-charged nanoparticles do not have enough momentum and are at too low of a concentration to manipulate the base fluid motion.

This "interfacial resistance to heat transfer" between two different materials is defined as the Kapitza resistance and is described as the differences in electronic and atomic vibrational states between the two materials, i.e. how easily an electron and a phonon can transport the energy (heat) from one material to another across an interface. This is ultimately a probability issue—the more available atomic vibrational and electronic states that are able to transport energy (heat) at the interface, the faster heat will be transported. By applying a voltage to the heat sink/source, surface-charged nanoparticles such as nanodiamonds are caused to be in very high concentration near the (often) metal interface. These nanodiamonds have electric and vibrational states that are more similar to metal than liquid is. This increase in similar atomic vibration and electric energy states increases the probability that a phonon or electron will cross from the metal into the nanoparticle near the interface. The polarity applied to the heat source is then reversed to repel the hot surface-charged nanoparticles away and into the fluid. Changing polarity again will bring fresh, cool surface-charged nanoparticles near the heat source once again.

Functionalized (surface-charged) nanoparticles are known. However, even when put in engine coolant, by themselves, they ordinarily do not produce any real increase in heat dissipation. Despite many papers citing how nanofluids increase thermal transfer efficiency, thermal transfer in typical heat exchanger systems is still limited by the resistance to thermal transfer at the interface between a solid and a liquid.

IBM and others have worked on nanostructured surfaces to increase the nanoscale surface area at the interface between dissimilar materials. This also increases the probability of heat transfer due to more surface area interacting with a liquid, other type of solid material, or air, but nanostructured surfaces in applications like engine coolant systems is not practical.

According to an aspect of the invention, a liquid is prepared to include a quantity of nanoparticles with a like-charged surface, i.e. all surface charges are positive (+) or negative (−). The nanoparticles (preferably, nanodiamonds) are covered with a molecule that has a partial charge due to the electron configuration within the surface atoms or molecules that cover the surface of the nanoparticle. A nanodiamond with hydrogen bonded to its surface has a positive (+) charge because of the smaller amount of electrons and the + impact of the hydrogen proton. Carboxylate or amine molecules have oxygen or nitrogen, respectively, that have more electrons orbiting them and that higher amount of electrons create a negative (−) charge on the surface of the diamond. In a preferred embodiment, diamonds that have a specific surface charge (+ or − depending on the molecules attached to the surface of the diamond) are added to the liquid. They can be added in powder form or added as a pre-mixed liquid solution into the bulk fluid. The charged surface of the nanoparticles will repel other surface-charged nanoparticles and keep the whole system equally suspended and have little risk for nanoparticle agglomeration. To enhance the thermal transport in the system, the heat source and heat sink will have an applied oscillating voltage. The heat source and heat sink are electrically isolated (e.g., via rubber or other electrically insulating gaskets separating them from pipes). The heat source and heat sink can either have their own voltage source or power supply or share a voltage source or power supply. It is also possible that only one of the heat source and heat sink will have a voltage source or power supply. If the heat source and heat sink share a voltage source or power supply, one lead will be attached to one (heat source or heat sink) and the opposite charged lead will be attached to the other. This alternating voltage will force the surface-charged nanoparticles towards and then away from the heat source-sink. The locally high nanoparticle density near the metal surface will increase the probability of an electron or a phonon to enter the nanoparticle (in the form of heat) from the metal. This is a way to effectively decrease the thermal resistance of the interface via higher probability of energy transport. The voltage will then switch polarity to repel the hot surface-charged nanoparticles away from the heat source for cold surface-changed nanoparticles away from the heat sink), then switch polarity again to bring fresh surface-charged nanoparticles to the surface again. The surface-charged nanoparticles manipulated by an applied electric field will also "short-circuit" the boundary layer of very low fluid motion at the interface between solid and liquid. This boundary layer occurs due to friction at the wall that slows down the liquid and reduces the convection heat transfer. The surface-charged nanoparticles, attracted by the charge of the heat source or heat sink, will pass through this thin layer of slow liquid motion and absorb heat.

In accordance with an aspect of the invention, a method is provided for charge-induced functionalized nanofluid heat transfer, the method comprising preparing a nanofluid so that a first type of nanoparticles in the nanofluid have a surface charge with a first polarity, and attracting the first type of nanoparticles in the nanofluid to one of a heat sink or a heat source by applying a first voltage to the one of the heat sink or the heat source, the first voltage having a second polarity opposite to the first polarity.

In accordance with another aspect of the present invention a system is provided for charge-induced functionalized nanofluid heat transfer, the system comprising one of a heat sink or a heat source, a nanofluid comprising a first type of nanoparticles having a surface charge with a first polarity, and means for supplying a voltage, the voltage supplying means being arranged to apply a first voltage to the one of the heat sink or the heat source, the first voltage having as second polarity opposite to the first polarity.

BRIEF DESCRIPTION OF THE DRAWINGS

The features and advantages of the present invention are well understood by reading the following detailed description in conjunction with the drawings in which like numerals indicate similar elements and in which:

FIGS. 1A-1C are schematic diagrams of possible shapes of nanoparticles useful for the invention;

FIG. 2 is a schematic diagram showing a liquid with nanoparticles with charged surfaces wherein the nanoparticles are attracted to a heat source or heat sink having an opposite applied voltage;

DETAILED DESCRIPTION

Figure 3:
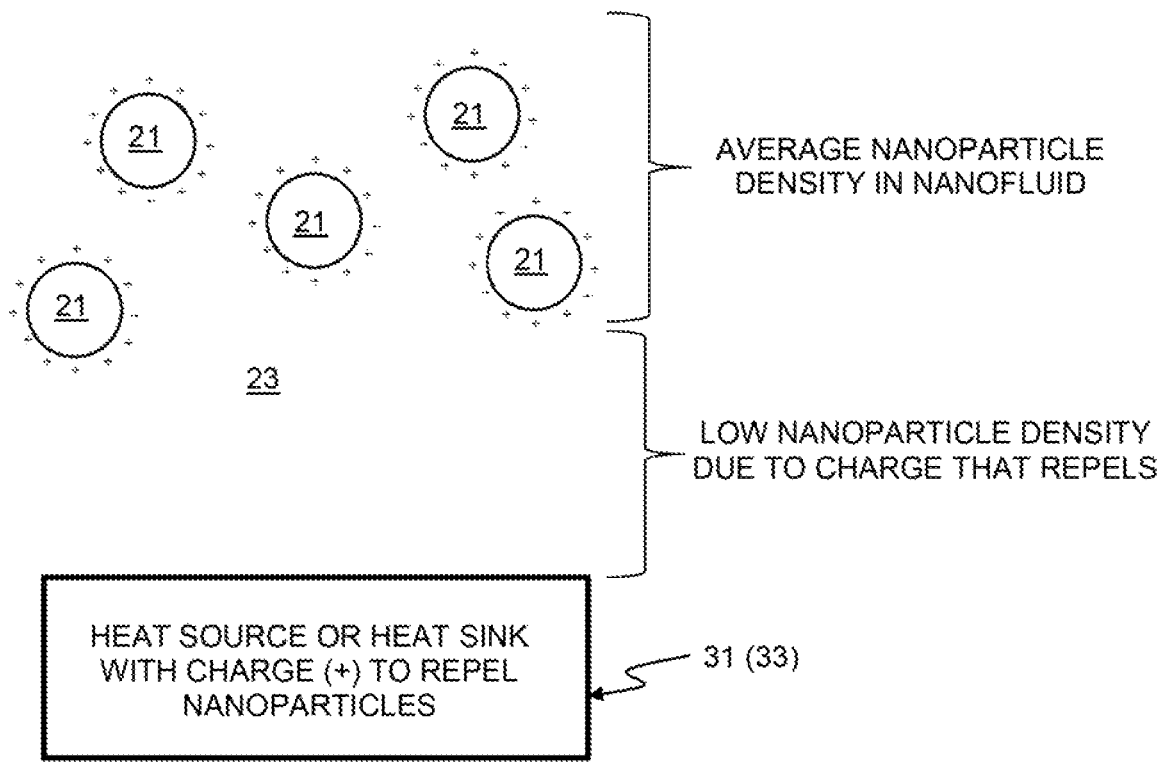
FIG. 3 is a schematic diagram showing a liquid with nanoparticles with charged surfaces wherein the nanoparticles are repelled by a heat source or heat sink having a same applied voltage.

According to the invention, a first type of nanoparticles 21 are provided with a particular surface charge with a particular polarity by attaching added functional groups to the first type of nanoparticles (i.e. the nanoparticles may be but need not be "monofunctionalized" in that they are modified by adding a single functional group). The nanoparticles are functionalized and the functional groups have the same charge, i.e. positive (+) or negative (−). These nanoparticles 21, each with a charged surface added to it, such as shown in FIGS. 1A-1C (sizes, shapes, and aspect ratios can vary based on desired purpose), are suspended in a liquid 23, as shown in FIGS. 2 and 3. The resulting nanofluid can be used for cooling or heating components in an apparatus such as the heat source 31 or heat sink 33 shown. It is presently believed that a practical range of weight percent of nanoparticle concentration will typically be between about 0.01 weight % and 2 weight %, however, concentrations outside of that range may be desirable in certain circumstances. An apparatus or system in which such cooling and heating might occur includes an internal combustion engine, wherein the heat source 31 might be a heated surface of the engine and the heat sink 33 might be, e.g., a radiator. The invention is not limited to internal combustion engines and is applicable to a variety of other apparatus requiring heat transfer, such as HVAC heat pumps, liquid cooled electronics or electric motors.

Figure 5:
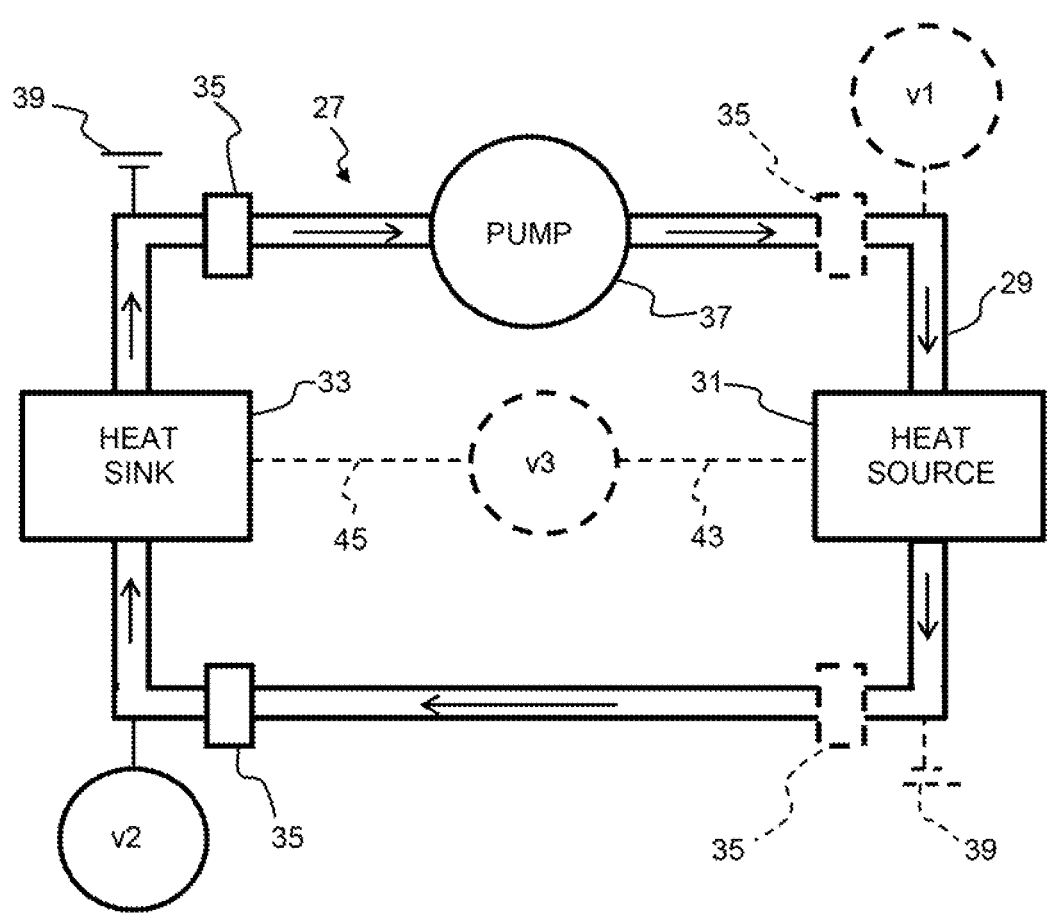
FIG. 5 is a schematic of a cooling system using a nanofluid according to an aspect of the invention.

FIG. 5 shows a system 27 for cooling or heating heat generating components, for example, an internal combustion engine and associated components. The system 27 includes a circuit including pipes 29 or other suitable conduits for circulating a nanofluid to a heat source 31 and a heat sink 33. The heat source 31 and heat sink 33 are electrically isolated (such as by rubber gaskets 35) separating them from the pipes 29. The heat source 31 and heal sink 33 can either have their own voltage source or power supply v1 (shown in phantom) and v2 or share a voltage source or power supply v3 (shown in phantom), if the heat source 31 and heat sink 33 share a voltage source or power supply v3, one lead 43 will be attached to one of the heat source or heat sink and the opposite charged lead 45 will be attached to the other one of the heat source or heal sink. It is also possible that only one of the heat source 31 and heat sink 33 will have a voltage source or power supply (e.g., only voltage source or power supply v2 to heat sink 33 or only voltage source or power supply v1 to heat source).

As shown in FIG. 3 (and in the liquid 23 remote from the heal source 31 (or heat sink 33) in FIG. 2), the charged surfaces of the of the surface-charged nanoparticles 21 will repel other surface-charged nanoparticles and keep the surface-charged nanoparticles in the system equally suspended so that there is reduced risk for nanoparticle agglomeration.

Figure 4:
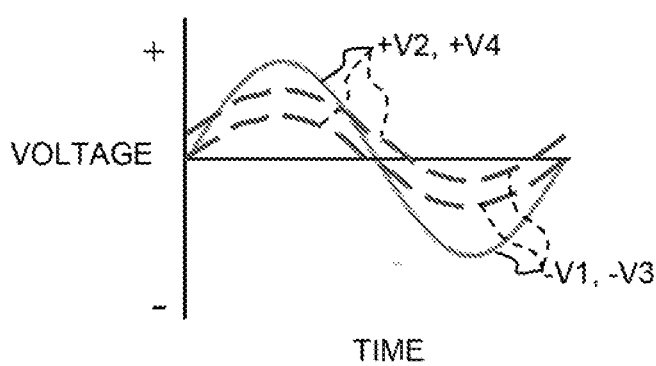
FIG. 4 is a graph showing an applied oscillating voltage versus time.

To enhance the thermal transport in the system 27 of FIG. 5, as the nanofluid circulates in the system, the heat source 31 (and/or the heat sink 33) will have an applied oscillating voltage V such as is shown, for example, by FIG. 4. This voltage V will force the surface-charged nanoparticles 21 towards (FIG. 2) and then away from (FIG. 3) each of the heat source 31 (or heat sink 33).

In FIG. 2, when the voltage V forces surface-charged nanoparticles 21 toward the heat source 31, this will result in a locally high nanoparticle density near the (usually) metal surface of the heal source which will increase the probability of an electron or a phonon entering the nanoparticle from the heat source. Similarly, when the voltage V forces surface-charged nanoparticles 21 toward the heat sink 33, the locally high nanoparticle density near the heal sink surface will increase the probability of an electron or a phonon transfer from the nanoparticle to the heat sink. In this way, the thermal resistance of the interface can be effectively decreased via higher probability of energy transport. The voltage V will then switch polarity to repel the hot surface-charged nanoparticles 21 away from the heat source 31 (or cold surface-charged nanoparticles away from the heat sink 33), then switch polarity again to bring fresh surface-charged nanoparticles to the heat source surface again and heated particles to the heat sink.

In a method for charge-induced functionalized nanofluid heat transfer according to an aspect of the present invention, a nanofluid is prepared so that a first type of nanoparticles 21 in the liquid 23 of the nanofluid have a surface charge with a first polarity (e.g., + or −). For purposes of discussion, it will be assumed that the first type of nanoparticles 21 have a positive (+) polarity. It is possible that the nanofluid will also have other types of nanoparticles than are involved in the present invention. Ordinarily, any other types of nanoparticles, if provided with a surface charge, will have a surface charge of the same polarity as the first type of nanoparticle. The first type of nanoparticles 21 in the nanofluid are attracted to one of the heat sink 33 or the heat source 31 by applying a first voltage −V1 (FIG. 4) to the one of the heat sink 33 or the heat source 31, the first voltage having a second polarity, in this example, negative (−), opposite to the first polarity (+). Attracting the first type of nanoparticles 21 in the nanofluid to the heat source 31 results in a locally high nanoparticle density near the heat source surface as seen in FIG. 2 and increases the probability of an electron or a phonon entering the nanoparticle. Attracting the first type of nanoparticles 21 toward the heat sink 33 results in a locally high nanoparticle density near the heat sink surface and increases the probability of an electron or a phonon being transferred from the nanoparticle to the heat sink.

After attracting the first type of nanoparticles 21 in the nanofluid to the one of the heat sink 33 or the heat source 31, the nanofluid can be moved past an opposite one of the heat sink 31 or the heat source 33. The opposite one of the heat sink 31 or the heat source 33 may or may not have a voltage applied thereto to attract surface-charged nanoparticles 21 to the surface of the opposite one of the heat sink or the heat source for beat transfer to occur, however, applying a voltage with a charge opposite the charge of the nanoparticles will result in a locally high nanoparticle density near the surface of the opposite one of the heat sink or the heat source and will increase the probability of an electron or a phonon being transferred from the nanoparticles to the heat sink or to the nanoparticles from the heat source.

After attracting the first type of nanoparticles 21 in the nanofluid to the one of the heat sink 33 or the beat source 31, the first type of nanoparticles can be repelled from the one of the heat sink or the heat source by applying a second voltage +V2 to the one of the heat sink or the or the heat source as seen in FIG. 3, the second voltage having the first polarity (+), i.e. the same polarity as the first type of nanoparticles. Repelling the nanoparticles 21 to which heat has been transferred from the heat source 31 or from which heat has been transferred to the heat sink 33 facilitates removing the nanoparticles from the region of locally high density near the surface of the heat source or heat sink where there is often a relatively slow moving boundary layer of the nanofluid and returning it to a faster moving main body of the fluid so that it can travel to the opposite one of the heat source or the heat sink and engage in heat transfer with those components.

As seen with reference to FIG. 4, the first voltage −V1 and the second voltage +V2 are ordinarily applied by oscillating voltage between the first voltage and the second voltage over time. The heat transfer mechanism is both voltage and frequency dependent. The magnitude of the voltage −V or +V may be changed (as illustrated by the solid line in FIG. 4 showing a higher magnitude than the dashed line having the same frequency) and will affect the force with which phonons electrons are transferred between nanoparticles and the heat source 31 or the heat sink 33. The voltage need not be oscillated about a zero voltage axis. Additionally, the voltage oscillation may have more of aa square shape than the sinusoidal shape shown in FIG. 4, i.e. the change from positive to negative and vice versa may happen rapidly and the positive and negative voltages may be substantially constant until switched to negative and positive, respectively. The frequency of the oscillation of the voltage can also be varied and affects how many heat transfer reactions will occur over time. Performance may be optimized for one voltage at one frequency and, at another voltage, at a different frequency. It is presently believed that it will ordinarily be desirable, but not necessary, that frequency should be above 10 Hz, preferably but not necessarily in the range of 50-5000 Hz. It is also presently believed that it will be ordinarily desirable, but not necessary, for the peak voltage (amplitude) to be within the range of 5 mV to 1.2V for maximum effectiveness. Above 1.2V may increase the rate of electrolysis of water based coolants. When the liquid 23 of the nanofluid is of the type that can break down at higher voltages, such as water or water-based coolants, then the voltage will ordinarily be kept below voltages around 1.2V. Coolants other than water or water-based coolants that do not tend to break down under high voltages, such as oil, may permit use of higher voltages.

FIG. 4 shows voltage oscillating in a pattern wherein a minimum voltage immediately follows a maximum voltage and vice versa, however, it will also be appreciated that voltage may be varied in any number of ways. For example, voltage may be increased to a (+) maximum, then reduced to 0V (or a lesser (+) voltage) for a period of time, increased to live same (or a different) (+) maximum again, reduced to 0V, etc., for several cycles, then decreased to one or more (−) negative peaks to repel (−) particles that had been attracted to the heat transfer surface. In other words, voltage does not need to go immediately from one polarity to an opposite polarity. While it will ordinarily be desirable to periodically repel particles from the vicinity of a heat transfer surface by applying a voltage with the same charge as the particles in order to minimize a tendency of particles to agglomerate and to enhance heat transfer, the method and apparatus according to the present invention does not always require operation in this manner. Upon information and belief, waveform shape is not as important as a time between peak and trough (maximum and minimum) voltages and dwell times at maximum, minimum, and 0V, all of which may be varied to achieve desired results.

The first type of nanoparticles 21 can be attracted to the opposite one of a heat sink 33 or the heat source 31 by applying a third voltage −V3 to the opposite one of the heat sink or the heat source, the third voltage having the second polarity (−), for enhanced heat transfer from live heat source or to the heat sink. This will ordinarily be done after repelling the first type of nanoparticles from the one of the heat sink 33 or the heat source 31 at which heat transfer to the heat sink or heat transfer from the heat source has occurred. After attracting the first type of nanoparticles 21 to the opposite one of the heat sink 33 or the heat source 31, the first type of nanoparticles in the nanofluid can be repelled from the opposite one of the heat sink or the heat source by applying a fourth voltage to the opposite one of the heat sink or the heat source, the fourth voltage having the first polarity (+).

Ordinarily, the nanofluid 21 will be continuously pumped past the one of the heat sink 33 or the heat source 31 and past the opposite one of the heat sink 33 or the heat source 33 by a pump 37. A magnitude of at least one of the first voltage −V1, the second voltage +V2, the third voltage −V3, and the fourth voltage +V4 can be adjusted, as can the frequency with which the voltage oscillates. A delivery rate of the pump 37 can be (but need not be) adjusted as a function of an adjustment of at least one of the magnitude of the first voltage −V1, the second volume +V2, the third voltage −V3, and the fourth voltage +V4 and a frequency of voltage oscillation to optimize heat transfer. Because increased voltage may result in a tendency for nanoparticles to overcome the repulsive forces and to agglomerate, increased frequency of voltage oscillation may be desirable to reduce this tendency as there will be less time and opportunity for agglomeration. Ordinarily, pump speed will be changed primarily based on the thermal demand of the system, independent of power supplied to the heat source and/or heat sink, although it may be changed based on power supplied to the heat source and/or heat sink. At least one of the magnitude of the first voltage −V1, the second voltage +V2, the third voltage −V3, and the fourth voltage +V4 and a frequency of voltage oscillation can be (but need not be) adjusted as a function of a rate at which the nanofluid is moved past the heat sink 31 or the heat source 33 so as to optimize heat transfer.

As seen in FIG. 5, the first voltage −V1 and the second voltage +V2 can be applied to, e.g., the heat source 31 via a first voltage source or power supply v1 (shown in phantom) and the third voltage −V3 and the fourth. voltage +V4 can be applied to, e.g. the heat sink 33, via a second voltage source or power supply v2. While it is presently believed to ordinarily be preferable to apply a voltage to both the heat source 31 and to the heat sink 33, it is also possible to apply a voltage to only one of the heat source and the heat sink (shown as voltage source or power supply v2 in FIG. 5, where voltage source or power supply V1 is shown in phantom). The need to apply voltages to heat sources and/or heat sinks will be dependent on initial system design and optimization of heat transfer. It is also possible to apply the first voltage −V and the second voltage +V2 and applying the third voltage −V3 and the fourth voltage +V4 via a common v voltage source or power supply v3 (shown in phantom).

If a voltage source is applied to each of the heat source 31 and the heat sink 33, the piping 29 connected to each of the heat source and the heat sink will preferably be connected to ground 39 between an insulator such as a rubber gasket 35 and the one of the heat source and the heat sink. If a voltage source is applied to only one of the heat source 31 and the heat sink 33, the piping connected to the one of the heat source and the heat sink to which the voltage is applied will ordinarily be connected to ground 39 between the insulator such as the rubber gaskets 35 and the one of the heat. source and the heat sink to which voltage is applied, and the other one of the heat source and the heat sink need not be connected to ground. If a voltage is applied to both the heat source 31 and the heat sink 33 by a common voltage source or power supply v3 a ground will ordinarily not be necessary, however, the heat source 31 may be connected to ground between the insulator such as the rubber gaskets 35 and the heat source, and the heat sink 33 may be connected to ground between the insulator such as the rubber gaskets and the heat sink. In all circumstances, the pump 37 will ordinarily be electrically insulated from the voltage applied to the heat source 31 and/or the heat sink 33 by any source of voltage, i.e. on an opposite side of an insulator such as a rubber gasket 35 from the heat source 31 or heat sink 33 to which voltage is applied.

The magnitude of the third voltage −V3 (and fourth voltage +V4) that is applied to, e.g., the heat sink 33 can be different from the magnitude of the first voltage −V1 (and second voltage +V2) that is applied to, e.g., the heat source 31, and the frequency with which the voltages applied to the heat sink and the heat source may also be different.

As seen in FIG. 5, the system 27 for charge-induced functionalized nanofluid heat transfer according to an aspect of the invention comprises at least one of a heat sink 33 or a heat source 31. The system 27 further comprises a nanofluid comprising a first type of nanoparticles 21 (e.g., FIGS. 1A-1C) having a surface charge with a first polarity (e.g., for purposes of discussion, positive +) suspended in liquid 23. The system 27 further comprises means, such as a battery, generator, photovoltaics, wind power, Seebeck (thermoelectric) effect, piezoelectrics, pyroelectrics, or any other suitable voltages source or power supply (voltage source or power supply v1, v2, v3), for supplying a voltage, the voltage supplying means being arranged to apply a first voltage −V1 to the one of the heat sink 33 or the heat source 31, the first voltage having a second polarity (−) opposite to the first polarity (+), so that nanoparticles having the first polarity (+) will be attracted to the one of the heat sink 33 or the heat source 31 having the second polarity (−).

Means such as a pump 37 is provided for moving the nanofluid past an opposite one of the heat sink 33 or the heat source 31 after attracting the first type of nanoparticles 21 in the nanofluid to the one of the heat sink or the heat source, i.e. the circuit may include both a heat sink and a heat source. The means for supplying the voltage and the means for moving the nanofluid may be configured so that a rate at which the means for moving the nanofluid can be a function of a magnitude of the first voltage, it being understood, however, that the bulk fluid movement is done via the means for moving the nanofluid, such as the pump 37. The means for supplying the voltage can be configured to adjust a magnitude of the first voltage −V1 (or other voltages +V2, −V3, +V4) and/or a frequency with which voltage is oscillated. The means for supplying the voltage can be arranged to apply, after applying the first voltage, a second voltage +V2 to the one of the heat sink 33 or the or the heat source 31, the second voltage having the first polarity (+) so that nanoparticles with the first polarity (+) will be repelled from the one of the heat sink or the heat source. A second voltage source or power supply v2 can be arranged to supply voltage to the opposite one of the heat sink 33 or the heat source 31. Instead of separate first and second voltage sources, a common voltage source or power supply v3 can be arranged to supply voltage to both the heat sink 33 and the heat source 31.

In the present application, the use of to ins such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A method for charge-induced functionalized nanofluid heat transfer, comprising:
   preparing a nanofluid so that a first type of nanoparticles in the nanofluid have a surface charge with a first polarity; and
   attracting the first type of nanoparticles in the nanofluid to one of a heat sink or a heat source by applying a first voltage to the one of the heat sink or the heat source, the first voltage having a second polarity opposite to the first polarity;
   after attracting the first type of nanoparticles in the nanofluid to the one of the heat sink or the heat source, repelling the first type of nanoparticles in the nanofluid from the one of the heat sink or the heat source by applying a second voltage to the one of the heat sink or the or the heat source, the second voltage having the first polarity;
   applying the first voltage and the second voltage by oscillating voltage between the first voltage and the second voltage over time; and
   attracting the first type of nanoparticles in the nanofluid to an opposite one of a heat sink or a heat source by applying a third voltage to the opposite one of the heat sink or the heat source, the third voltage having the second polarity.

2. The method as set forth in claim 1, comprising moving the nanofluid past an opposite one of the heat sink or the heat source.

3. A method for charge-induced functionalized nanofluid heat transfer, comprising:
   preparing a nanofluid so that a first type of nanoparticles in the nanofluid have a surface charge with a first polarity;
   attracting the first type of nanoparticles in the nanofluid to one of a heat sink or a heat source by applying a first voltage to the one of the heat sink or the heat source, the first voltage having a second polarity opposite to the first polarity;
   moving the nanofluid past an opposite one of the heat sink or the heat source, and
   adjusting a magnitude of the first voltage as a function of a rate at which the nanofluid is moved past the opposite one of the heat sink or the heat source.

4. The method as set forth in claim 3, comprising, after attracting the first type of nanoparticles in the nanofluid to the one of the heat sink or the heat source, repelling the first type of nanoparticles in the nanofluid from the one of the heat sink or the heat source by applying a second voltage to the one of the heat sink or the or the heat source, the second voltage having the first polarity.

5. The method as set forth in claim 4, comprising applying the first voltage and the second voltage by oscillating voltage between the first voltage and the second voltage over time.

6. The method as set forth in claim 5, comprising attracting the first type of nanoparticles in the nanofluid to an opposite one of a heat sink or a heat source by applying a third voltage to the opposite one of the heat sink or the heat source, the third voltage having the second polarity.

7. The method as set forth in claim 1, attracting the first type of nanoparticles in the nanofluid to the opposite one of the heat sink or the heat source by applying the third voltage to the opposite one of the heat sink or the heat source after repelling the first type of nanoparticles in the nanofluid from the one of the heat sink or the heat source.

8. The method as set forth in claim 7, comprising pumping the nanofluid past the one of the heat sink or the heat source and past the opposite one of the heat sink or the heat source.

9. The method as set forth in claim 1, comprising, after attracting the first type of nanoparticles in the nanofluid to the opposite one of the heat sink or the heat source, repelling the first type of nanoparticles in the nanofluid from the opposite one of the heat sink or the heat source by applying a fourth voltage to the opposite one of the heat sink or the heat source, the fourth voltage having the first polarity.

10. The method as set forth in claim 9, comprising adjusting at least one of a magnitude of the first voltage, the second voltage, the third voltage, and the fourth voltage and a frequency of voltage oscillation.

11. The method as set forth in claim 9, comprising adjusting a delivery rate of the pump as a function of an adjustment of at least one of a magnitude of at least one of the first voltage, the second voltage, the third voltage, and the fourth voltage and a frequency of voltage oscillation.

12. The method as set forth in claim 9, comprising applying the third voltage and the fourth voltage by oscillating voltage between the third voltage and the fourth voltage over time.

13. The method as set forth in claim 12, comprising applying the first voltage and the second voltage by oscillating voltage between the first voltage and the second voltage over time.

14. The method as set forth in claim 13, comprising applying the first voltage and the second voltage via a first voltage source and applying the third voltage and the fourth voltage via a second voltage source.

15. The method as set forth in claim 13, comprising applying the first voltage and the second voltage and applying the third voltage and the fourth voltage via a common voltage source.

16. The method as set forth in claim 1, comprising pumping the nanofluid past the one of the heat sink or the heat source and past the opposite one of the heat sink or the heat source.

17. The method as set forth in claim 1, wherein a magnitude of the third voltage is different from a magnitude of the first voltage.

18. The method as set forth in claim 1, comprising adjusting a magnitude of the first voltage.

19. The method as set forth in claim 1, wherein the nanofluid is prepared so that the first type of nanoparticles in the nanofluid have the surface charge with the first polarity by attaching added functional groups to the first type of nanoparticle.

* * * * *